United States Patent

Sakurai et al.

[11] Patent Number: 6,060,863
[45] Date of Patent: May 9, 2000

[54] CHARGE AND DISCHARGE CONTROL CIRCUIT AND CHARGEABLE POWER SUPPLY UNIT

[75] Inventors: Atsushi Sakurai; Hiroshi Mukainakano; Masanao Hamaguchi, all of Chiba, Japan

[73] Assignee: Seiko Instruments Inc., Japan

[21] Appl. No.: 09/072,287

[22] Filed: May 4, 1998

[30] Foreign Application Priority Data

Jul. 5, 1997 [JP] Japan .................................... 9-117243

[51] Int. Cl.[7] ............................. H01M 10/44; H02H 3/18
[52] U.S. Cl. .............................................. 320/136; 361/79
[58] Field of Search ............................... 320/136; 361/78, 361/79, 88

[56] References Cited

U.S. PATENT DOCUMENTS

5,493,197  2/1996  Eguchi et al. ........................... 320/116
5,519,563  5/1996  Higashijima et al. .................... 361/16

*Primary Examiner*—Peter S. Wong
*Assistant Examiner*—Gregory J. Toatley, Jr.
*Attorney, Agent, or Firm*—Adams & Wilks

[57] ABSTRACT

To improve operation reliability of a charge and discharge control circuit and a chargeable power supply unit using it, and to improve the life of secondary cell. In the charge and discharge control circuit of the chargeable power supply unit, the circuit surely keeps control operation during voltage of the cell falls down because of discharge current and, over-current state and over-discharge state occur at the same time. After detecting the stop of discharge current, the circuit stops control operation turning in over-discharge state so as to hold down useless power consumption

11 Claims, 10 Drawing Sheets

CHARGE AND DISCHARGE CONTROL CIRCUIT AND CHARGEABLE POWER SUPPLY UNIT

BACKGROUND OF THE INVENTION

The present invention relates to a charge and discharge control circuit for controlling the charging and discharging of a secondary cell by use of an ON/OFF of a switch circuit, and to a chargeable power supply unit using the circuit.

Figure 2:
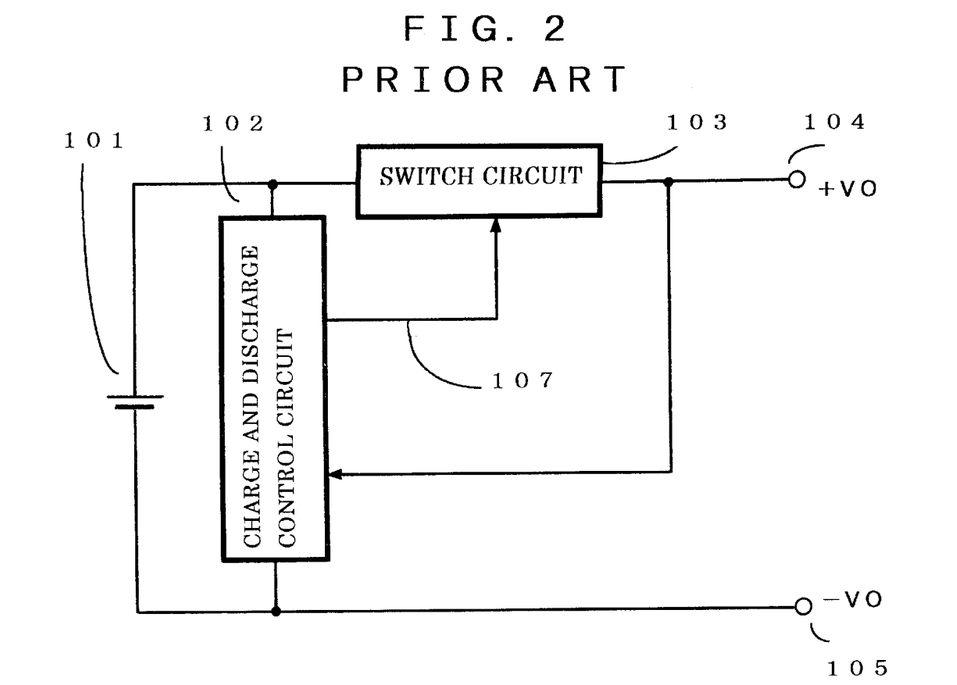
FIG. 2 is a circuit block diagram showing an example of the prior chargeable power supply unit.

In the prior art, many chargeable power supply units comprising a secondary cell, a chargeable power supply unit has been disclosed having the construction shown in the circuit block diagram of FIG. 2. This construction is disclosed in Japanese Patent Disclosure H4-75430 entitled, "Chargeable power supply unit" for example. A secondary cell 101 is connected to an external terminal −V0 105 or +V0 104 through a switch circuit 103. A charge and discharge control circuit 102 is connected in parallel to the secondary cell 101. The charge and discharge control circuit 102 has a function of detecting the voltage and current of the secondary cell 102. A charge and discharge inhibiting signal 107 is output from the charge and discharge control circuit 102 so that the switch circuit 103 turns OFF and stops charge current or discharge current in any of the following states: an over-charge state in which the voltage of the secondary cell 101 is higher than the predetermined voltage; an over-discharge state in which the voltage of the secondary cell 101 is lower than another predetermined voltage; and an over-current state in which a current larger than a predetermined current flows through the switch circuit 103 and the voltage of the external terminal +V0 104 reaches a certain voltage. Hereafter, states in which the secondary cell 101 is in over-charge state, an over-discharge state, or a charge or discharge stopping state caused by over-current are respectively referred to as an overcharge protection state, over-discharge protection state, and over-current protection state.

Figure 3:
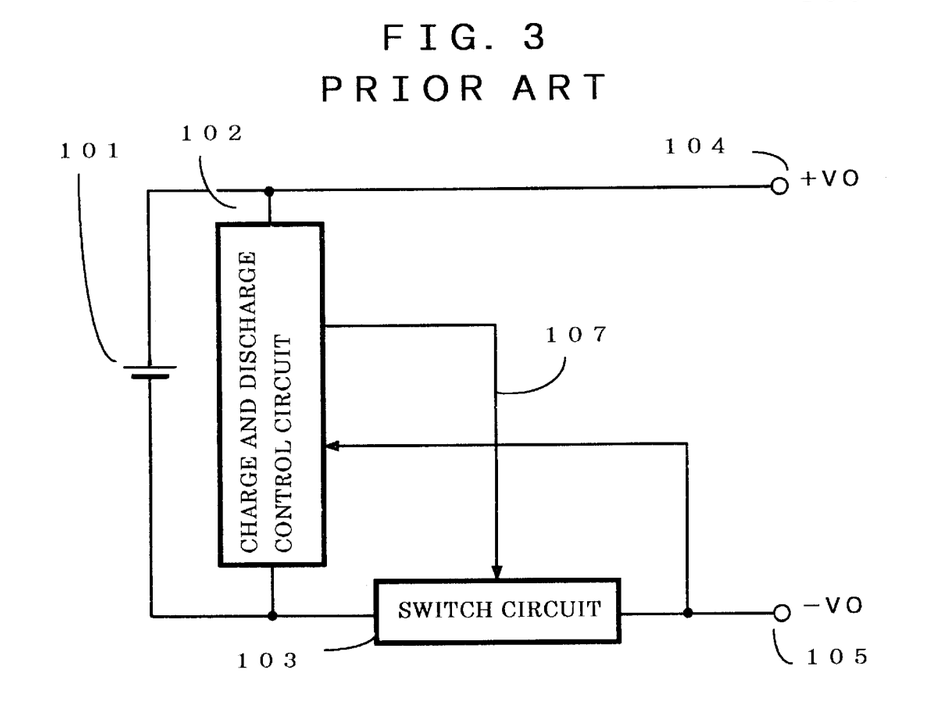
FIG. 3 is a circuit block diagram showing another example of the prior chargeable power supply unit.

As an another example of a known chargeable power supply unit comprising a secondary cell, a power supply unit having the circuit block diagram shown in FIG. 3 is known. The switch circuit 103 shown in FIG. 2 is connected to the negative side of the secondary cell in series in the circuit, and the operation of the circuit is similar to that of the circuit of FIG. 2.

Figure 4:
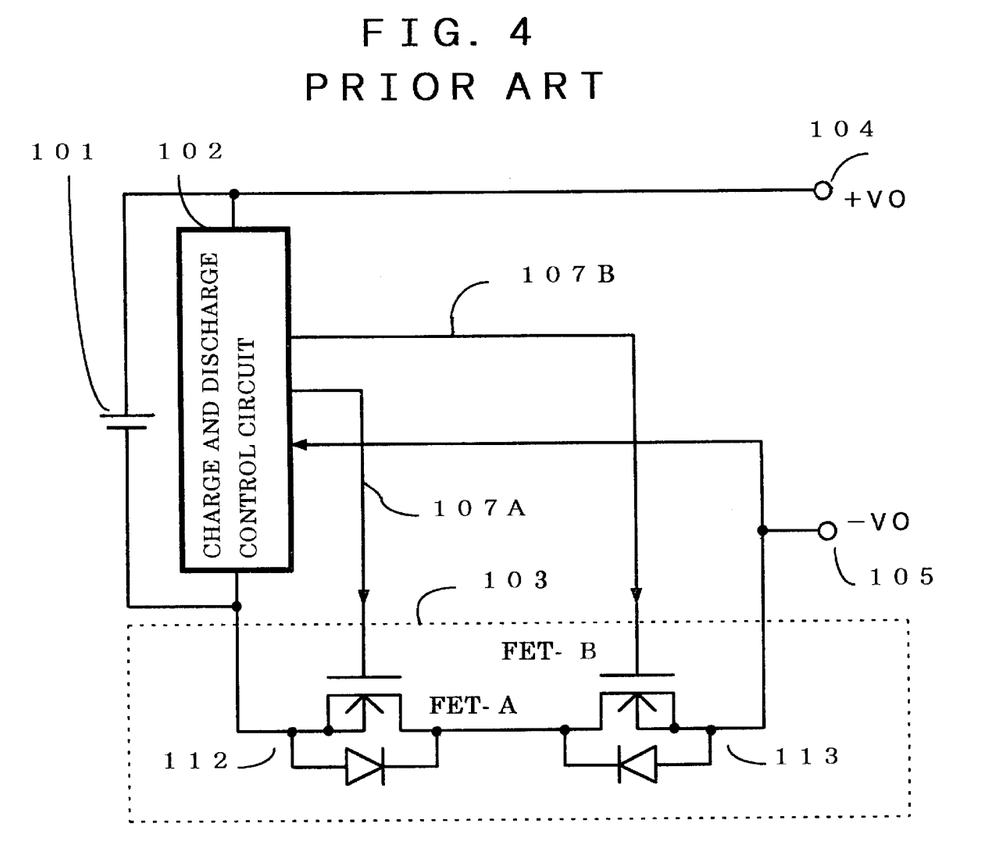
FIG. 4 is a circuit block diagram showing another example of the prior chargeable power supply unit.

Generally two FETs (Field Effect Transistor) are used in the switch circuit 103. As an another example of the prior art using the switch circuit, a power supply unit having the circuit block diagram shown in FIG. 4 is known. In FIG. 4, a switch circuit 103 comprises two FETs, operates so as to turn FET-A 112 OFF and to stop discharge current in an over-discharge or over-current state, and operates so as to turn an FET-B 113 OFF and to stop charge current in an over-charge state. Because of that, a signal for controlling the switch circuit is divided into two signals, namely a discharge inhibiting signal 107A and a charge inhibiting signal 107B.

Figure 5:
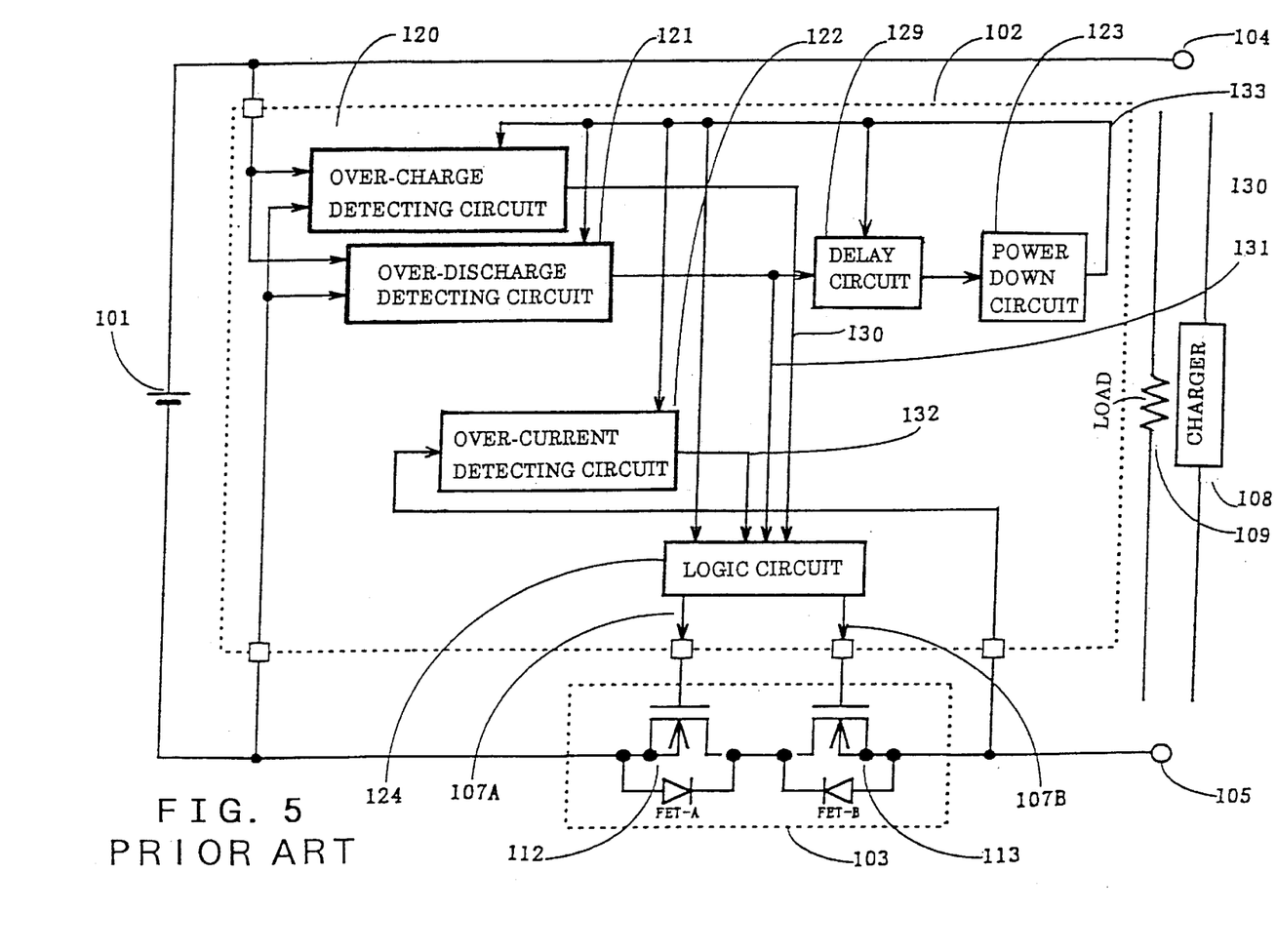
FIG. 5 is a circuit block diagram showing another example of the prior charge and discharge control circuit and the chargeable power supply unit.

As the prior art having a useful function, a power supply unit like the circuit block diagram shown in FIG. 5 is known as well. In FIG. 5, a charge and discharge control circuit 102 comprises an over-charge detecting circuit 120, an over-discharge detecting circuit 121, an over-current detecting circuit 122, a power down circuit 123, a logic circuit 124, and a delay circuit 129. In FIG. 5, a charger 108 is connected between external terminals +V0 104 and −V0 105, an over-charge detecting signal 130 is output to the logic circuit 124 from the over-charge detecting circuit 120 when the voltage of the secondary cell 101 exceeds the upper limit of charge voltage lasts for a predetermined time. A load 109 is connected between external terminals +V0 104 and −V0 105, an over-discharge detecting signal 131 is output to the logic circuit 124 from the over-discharge detecting circuit 121 when the voltage of the secondary cell 101 exceeds the lower limit of discharge voltage for a predetermined time. An over-current detecting signal 132 is output to the logic circuit 124 from the over-current detecting circuit 122 when the discharge current flowing through the switch circuit 103 exceeds the upper limit and the voltage of the external terminal −V0 105 exceeds the predetermined voltage by ON resistance for a predetermined time. When the over-charge detecting signal 130 is input, the logic circuit 124 outputs the charge inhibiting signal 107B to the FET-B 113 so as to stop charge current. When the over-discharge detecting signal 131 or the over-current detecting signal 132 is input, the discharge inhibiting signal 107A is output to the FET-A 112 so as to stop discharge current.

The over-discharge detecting signal 131 is also output to the power down circuit 123 through the delay circuit 129. As a result, the power down circuit 123 outputs power down signals to each circuit so as to stop the operation of each circuit so that the charge and discharge control circuit 102 does not consume power. Hereafter, the state in which the operation of the charge and discharge control circuit 102 stops is called a power down state. If the charge and discharge control circuit 102 is placed in a power down state once, the charge and discharge control circuit does not open again until a new charge operation starts.

Only when the over-discharge detecting signal 131 is output for the predetermined time, does the delay circuit 129 output the signal to the power down circuit 123. The delay circuit 129 is useful when voltage of the secondary cell 101 falls by over-discharge current, and when an over-current state and an over-discharge state occur at the same time. It means that, in the power supply unit of FIG. 5, the delay circuit 129 stop the over-discharge detecting signal, and inhibits placing the circuit in a power down state, and keeps the charge and discharge control circuit 102 operating for a certain time after the over-current state occurs even in an over-discharge state. The time is determined by forecasting the time that the discharge inhibiting signal 107A stops discharge current. As the over-current protection state stops the flow of discharge current and voltage of the secondary cell 101 thus returns to normal, the over-discharge state is canceled before the delay circuit 129 outputs the over-discharge detecting signal, and starts voltage monitoring again without placing the circuit in a power down state. As the power consumption of the charge and discharge control circuit 102 remains for a certain time even in an over-current protection state, voltage of the secondary cell 101 falls gradually and eventually results in a power down state to stop operation of the charge and discharge control circuit 102.

However in the prior power supply unit constructed as shown in FIG. 5, there has been a problem in that a mistake in the determination of delay time for stopping discharge current causes a malfunction. There has been a problem in that a longer delay time than that which is sufficient for determination is needed than time that discharge current stops and voltage of the secondary cell returns in order to remove malfunction actually. There has been a problem in that the delay circuit 129 is complex and the use of resistors and capacitors makes the circuit large. There has been a problem in that the delay circuit 129 often uses a delay circuit in over-discharge detecting circuit 122 actually, at that case, delay time is needed to determine longer than delay time in over-current detecting circuit 122, and the determination of delay time of over-discharge detecting circuit 121 is limited.

To solve these problems, an object of the present invention is to provide a charge and discharge control circuit using a simple, small circuit, which keeps surely control operation while discharge current flows, voltage of the cell falls, and over-current state and over-discharge state occur at the same time, and stops control operation thereof after stopping instantly discharge current.

SUMMARY OF THE INVENTION

To solve the above-mentioned problems, a charge and discharge control circuit and a chargeable power supply unit have a circuit which inhibits an over-discharge detecting operation at the time an over-current state occurs, and, after that, detects operation that discharge current stops and voltage of the cell returns, and stops inhibiting the over-discharge detecting operation.

In the charge and discharge control circuit and the chargeable power supply unit constructed as described above, the secondary cell is controlled without malfunction by using a simple, small detecting circuit in the case that an over-current state and an over-discharge state occur at the same time. Further the determination of long delay time is not needed to prevent a malfunction, and a complex, large circuit is not needed for the purpose. Delay time of the over-discharge detecting circuit is freely determined without limitation, and the circuit and the unit are applied for wider needs.

DETAILED DESCRIPTION OF THE INVENTION

Referring to the attached figures, various embodiments of the present invention will be described below.

Figure 1:
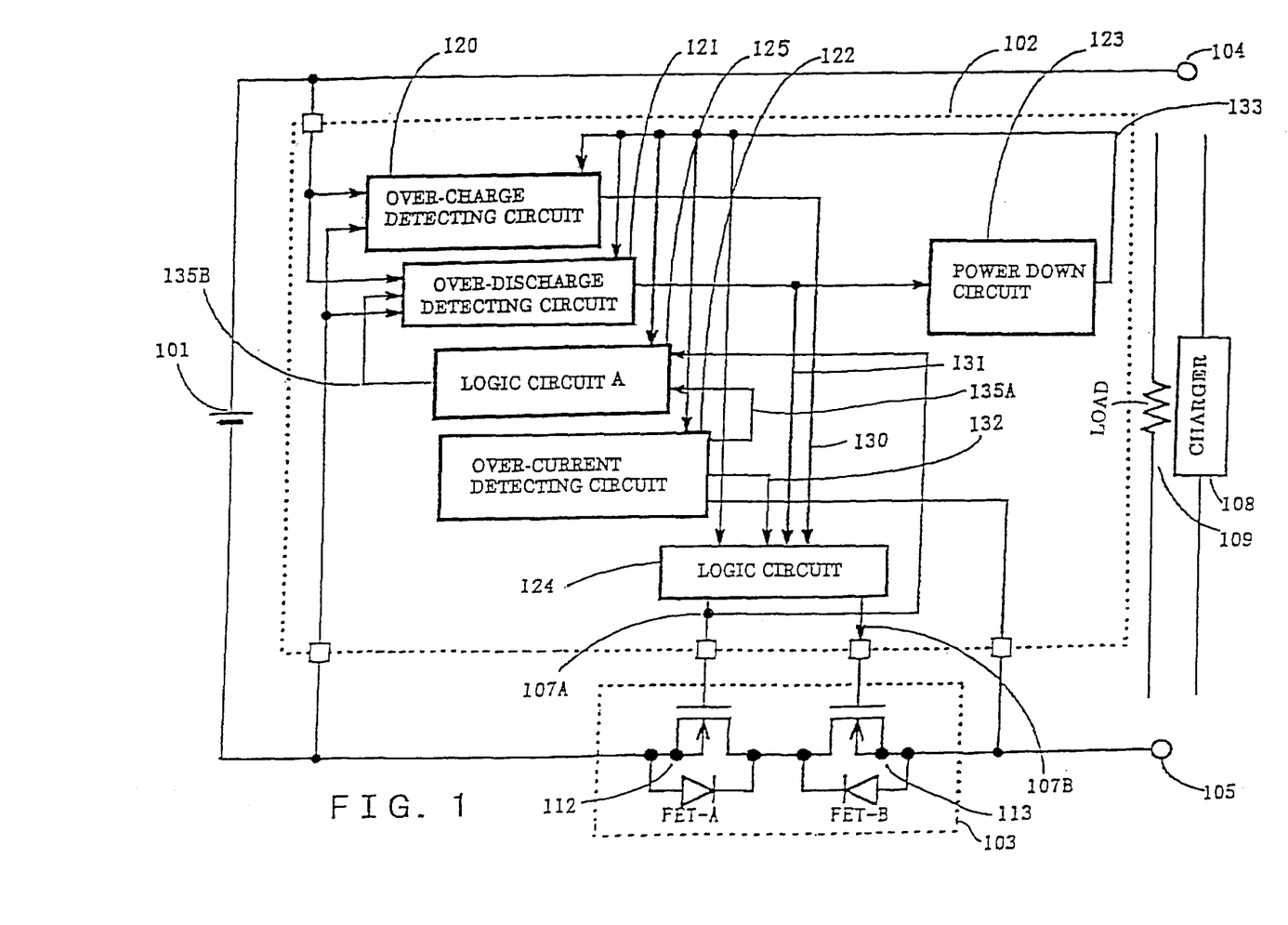
FIG. 1 is a circuit block diagram showing an embodiment of a charge and discharge control circuit and a chargeable power supply unit of the present invention.

FIG. 1 is a circuit block diagram showing an embodiment of a charge and discharge control circuit and a chargeable power supply unit of the present invention. In FIG. 1, a charge and discharge control circuit 102 comprises an over-charge detecting circuit 120, an over-discharge detecting circuit 121, an over-current detecting circuit 122, a power down circuit 123, a logic circuit 124, and a logic circuit A 125.

In FIG. 1, a charger 108 is connected between external terminals +V0 104 and −V0 105, an over-charge detecting signal 130 is output to the logic circuit 124 from the over-charge detecting circuit 120 when the voltage of the secondary cell 101 exceeds the upper limit of charge voltage thereof for a predetermined time. A load 109 is connected between external terminals +VO 104 and −V0 105, an over-discharge detecting signal 131 is output to the logic circuit 124 from the over-discharge detecting circuit 121 when the voltage of the secondary cell 101 exceeds the lower limit of discharge voltage thereof for a predetermined time. An over-current detecting signal 132 is output to the logic circuit 124 from the over-current detecting circuit 122 when the discharge current flowing through the switch circuit 103 exceeds an upper limit and the voltage of the external terminal −V0 105 exceeds a predetermined voltage by ON resistance for a predetermined time. When the over-charge detecting signal 130 is input, the logic circuit 124 outputs the charge inhibiting signal 107B to the FET-B 113 so as to stop charge current. When the over-discharge detecting signal 131 or the over-current detecting signal 132 is input, the discharge inhibiting signal 107A is output to the FET-A 112 so as to stop discharge current.

The over-discharge detecting signal 131 is output to the power down circuit 123. As a result, the power down circuit 123 outputs power down signals to each circuit so as to stop the operation of each circuit so that the charge and discharge control circuit 102 does not consume power. Hereafter, the state in which the operation of the charge and discharge control circuit 102 stops is called a power down state. If the charge and discharge control circuit 102 is placed in a power down state, the charge and discharge control circuit does not turn on again until new charge operation starts.

The over-current detecting circuit 122 outputs an over-discharge detecting inhibiting signal 135A instantly when the circuit is in an over-current state. The over-discharge detecting inhibiting signal 135A is input to the logic circuit A 125, and the logic circuit A 125 outputs an over-discharge detecting inhibiting signal 135B to the over-discharge detecting circuit 121. Then, the over-discharge detecting circuit 121 does not output the over-discharge detecting signal 131 independently of the voltage of the secondary cell 101. When an over-current detecting signal 132 is output after predetermined time and a discharge inhibiting signal 107A is output from the logic circuit 124 receiving the signal, the logic circuit A 125 to which the discharge inhibiting signal 107A is input to can not output the over-discharge detecting inhibiting signal 135 B. Then, the over-discharge detecting circuit 121 starts the over-discharge detecting operation again, and outputs the over-discharge detecting signal 131 according to the voltage of the secondary cell 101.

This is useful when the voltage of the secondary cell 101 falls by over-discharge current, and when an over-current state and an over-discharge state occur at the same time. It means that, in the power supply unit of the present invention, the unit does not enter a power down state so as to keep in operation the charge and discharge control circuit 102 even in an over-discharge state as the over-discharge detecting signal 131 is not output during the time from when the over-current state occurs to when the over-current detecting signal 132 is output and the discharge inhibiting signal 107A is output. As discharge current stops by output of the discharge inhibiting signal 107A and over-discharge detecting starts again at the time when the voltage of the secondary cell 101 returns to normal, the voltage of the secondary cell 102 falls gradually by power consumption of the charge and discharge control circuit 102. When in an over-discharge state, the charge and discharge control circuit 102 stops because of entry in a power down state and prevents additional power consumption. When the power down state is inhibited, it is not necessary to produce long delay time to spare, over-discharge detecting delay time is freely determined without limiting of over-current detecting delay time, and a complex, large delay circuit is not needed.

Figure 6:
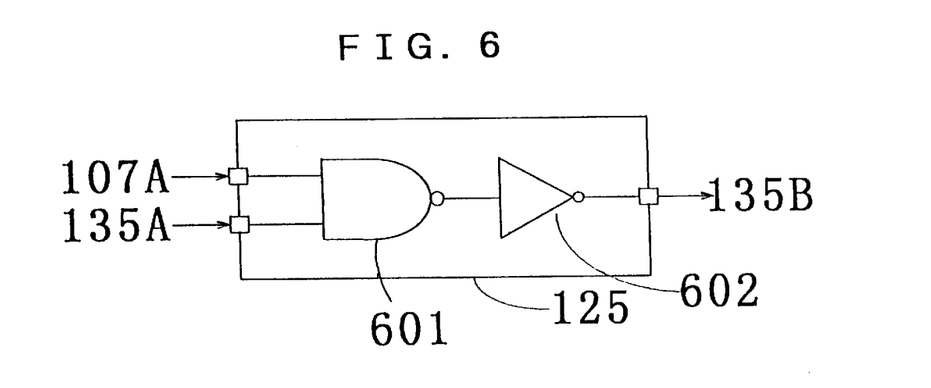
FIG. 6 is a circuit diagram showing an embodiment of a logic circuit A 125 in the charge and discharge control circuit of the present invention.

FIG. 6 is a circuit diagram showing an embodiment of a logic circuit A 125 of the present invention. In FIG. 6, the logic circuit has a construction in which an output of a NAND gate circuit 601 is connected to an input of an inverter circuit 602. A discharge inhibiting signal 107A and an over-discharge detecting inhibiting signal 135A are input to inputs of the NAND circuit. As an FET-A 112 controlling discharge comprises NMOS transistor, the discharge inhibiting signal 107A is Lo level in the embodiment. The over-discharge detecting inhibiting signal 135A and an over-discharge detecting inhibiting signal 135B are both Hi. In the logic circuit A 125 of FIG. 6, Hi is output from the invertor circuit 602 only when two input signals are both Hi, and Lo is output in other case. In other words, the over-discharge detecting inhibiting signal 135B can be output when the over-discharge detecting inhibiting signal 135A is output and the discharge inhibiting signal 107A is not output. Thus, the logic circuit A 125 is constructed with very simple, small circuit comparing the prior delay circuit 129. Therefore, the charge and discharge control circuit of the Present invention is produced with small size and low cost. The logic circuit A 125 can have a detector circuit and various circuits freely from the embodiment.

As the power supply unit of the present invention cancels the over-discharge detecting inhibiting signal 135B detecting the discharge inhibiting signal 107A, the unit does not strictly detect stopping of discharge current. However, if the over-discharge detecting inhibiting signal 135B is canceled a moment earlier, time that the FET-A 112 stops discharge current is generally several μs, and it is shorter enough than time that the over-discharge detecting signal 131 is output through the delay circuit of delay time from several ten to several hundred μs in the over-discharge detecting circuit 121. This is small matter because voltage of the secondary cell 101 returns before output of the over-discharge detecting signal 131. Therefore, The similar effect to detecting stopping of discharge current is obtained.

Figure 11:
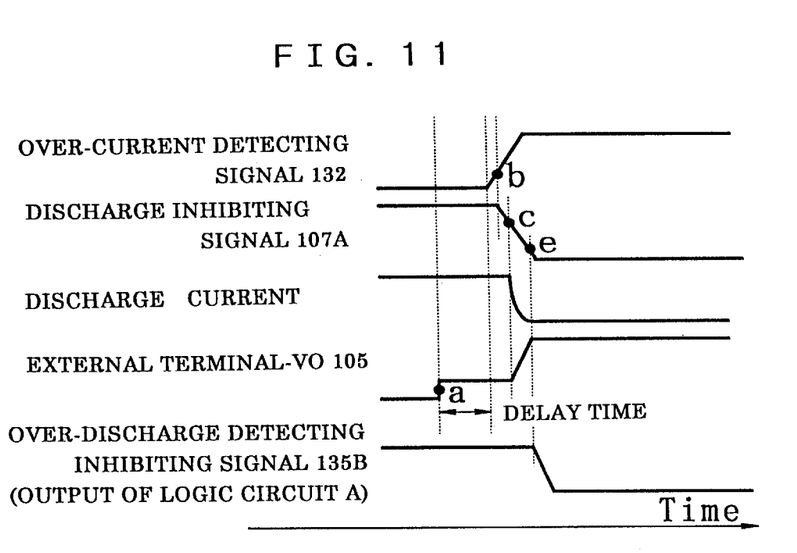
FIG. 11 is a timing chart of each signal during from occurrence of over-current state to entrance of over-current protection state in a charge and discharge control circuit and is chargeable power supply unit of the present invention.

FIG. 11 is a timing chart of each signal during from occurrence of over-current state to entrance of over-current protection state in the charge and discharge control circuit and a chargeable power unit of the present invention. In FIG. 11, when over-current state occurs, voltage of an external terminal −V0 105 rises, and Hi which is over-current detecting signal 132 is output after the predetermined delay time from time which the over-current detecting circuit 122 detects point "a". The logic circuit 124 detects point "b" and outputs Lo which is the discharge inhibiting signal 107A. Then, the FET-A 112 detects point "c" and stops discharge current. At this time, in the embodiment of FIG. 1, delayed for the FET-A 112, the logic circuit A 125 detects point "e" and can cancel the over-charge detecting inhibiting signal 135B. Here, the logic circuit A 125 is designed so that operating point "e" of input stage that discharge inhibiting signal 107A input to is lower than operation point "c" of the input stage of the FET-A 112. As stop of discharge current is earlier than cancellation of over-discharge detecting inhibiting signal 135B only with control of operation point without increasing other circuits, the charge and discharge control circuit of the present invention is provided in low cost, which is very desirable.

A delay circuit could be formed in order that stop of discharge current is carried out earlier than cancellation of the over-discharge detecting inhibiting signal 135B. In this case, the delay circuit can be made small being differ from the prior delay circuit 129 as the delay circuit has short delay time.

Next, another embodiment of a charge and discharge control circuit and a chargeable power supply unit of the present invention will be described.

Figure 7:
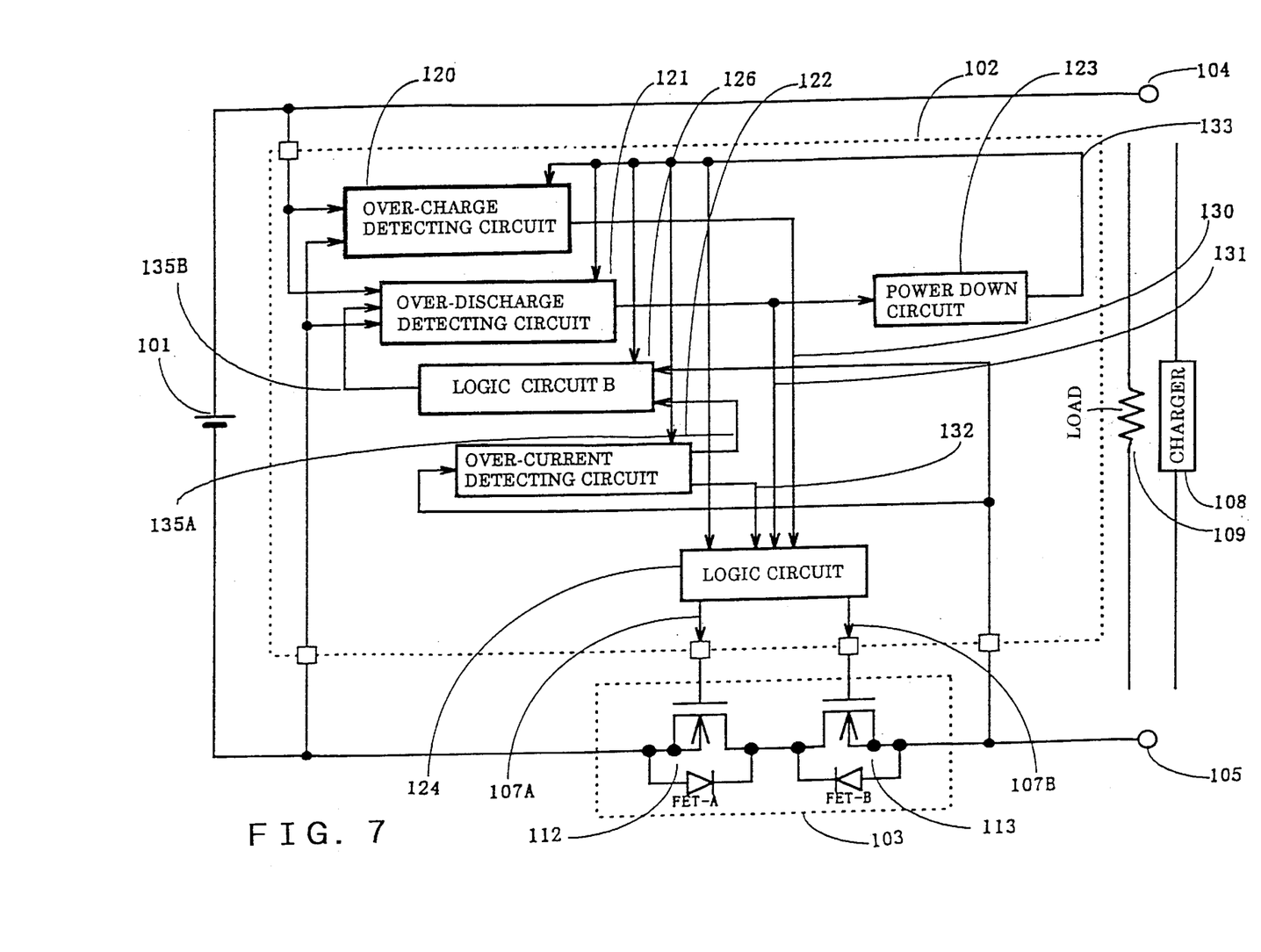
FIG. 7 is a circuit block diagram showing another embodiment of a charge and discharge control circuit and a chargeable power supply unit of the present invention.

FIG. 7 is a circuit block diagram showing another embodiment of a charge and discharge control circuit and a chargeable power supply unit of the present invention. Comparing with FIG. 1, in FIG. 7, the logic circuit A 125 is changed to a logic circuit B126, and voltage of the external terminal −V0 105 is input to the logic circuit B 126. Other circuit operation is similar to FIG. 1.

Figure 8:
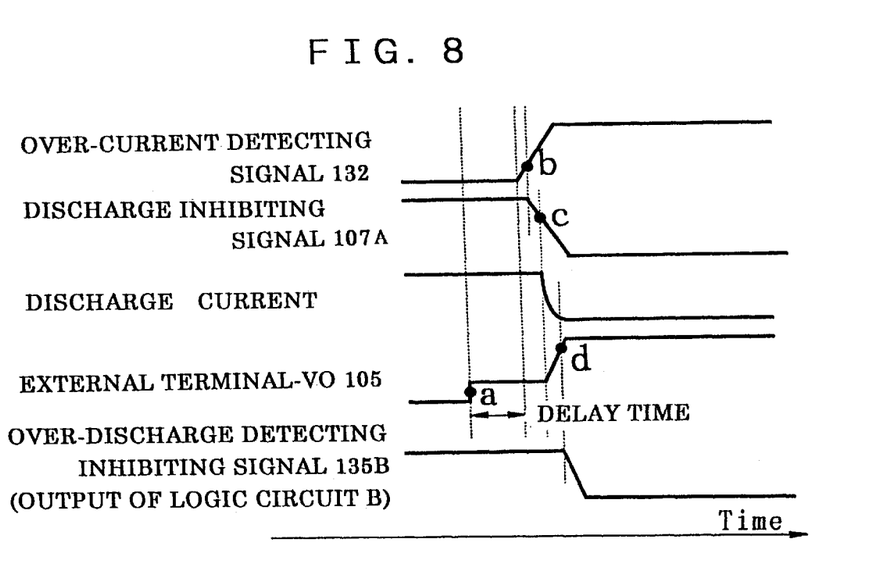
FIG. 8 is a timing chart of each signal during from occurrence of over-current state to entrance of over-current protection state in a charge and discharge control circuit and a chargeable power supply unit of the present invention.

FIG. 8 is a timing chart of each signal during from occurrence of over-current state to over-current protection state in a charge and discharge control circuit and a chargeable power supply unit of the present invention. In FIG. 8, voltage of the external terminal −V0 105 rises by occurrence of over-current state, and an over-current detecting circuit 122 detects point "a" so that Hi which is a over-current detecting signal 132 is output after the predetermined delay time. The logic circuit 124 detects point "b" and outputs Lo which is the discharge inhibiting signal 107A. Then, the FET-A 112 detects point "c" and stops discharge current. By the stop of discharge current, voltage of the external terminal +V0 105 rises till voltage of the external terminal −V0 104 so as to be pulled by a load connected thereto. At this time, in the embodiment of FIG. 7, the logic circuit B 126 detects point "d" of FIG. 7 to cancel the over-detecting inhibiting signal 135B. The logic circuit B 125 can take a small, simple, various construction as same as the logic circuit A 125.

As the over-discharge detecting inhibiting signal 135B is canceled detecting voltage of the external terminal −V0 105 rising by stop of discharge current, the embodiment of FIG. 7 monitors stop of discharge current.

Next, another embodiment of a charge and discharge control circuit and a chargeable power supply unit of the present invention will be described.

Figure 9:
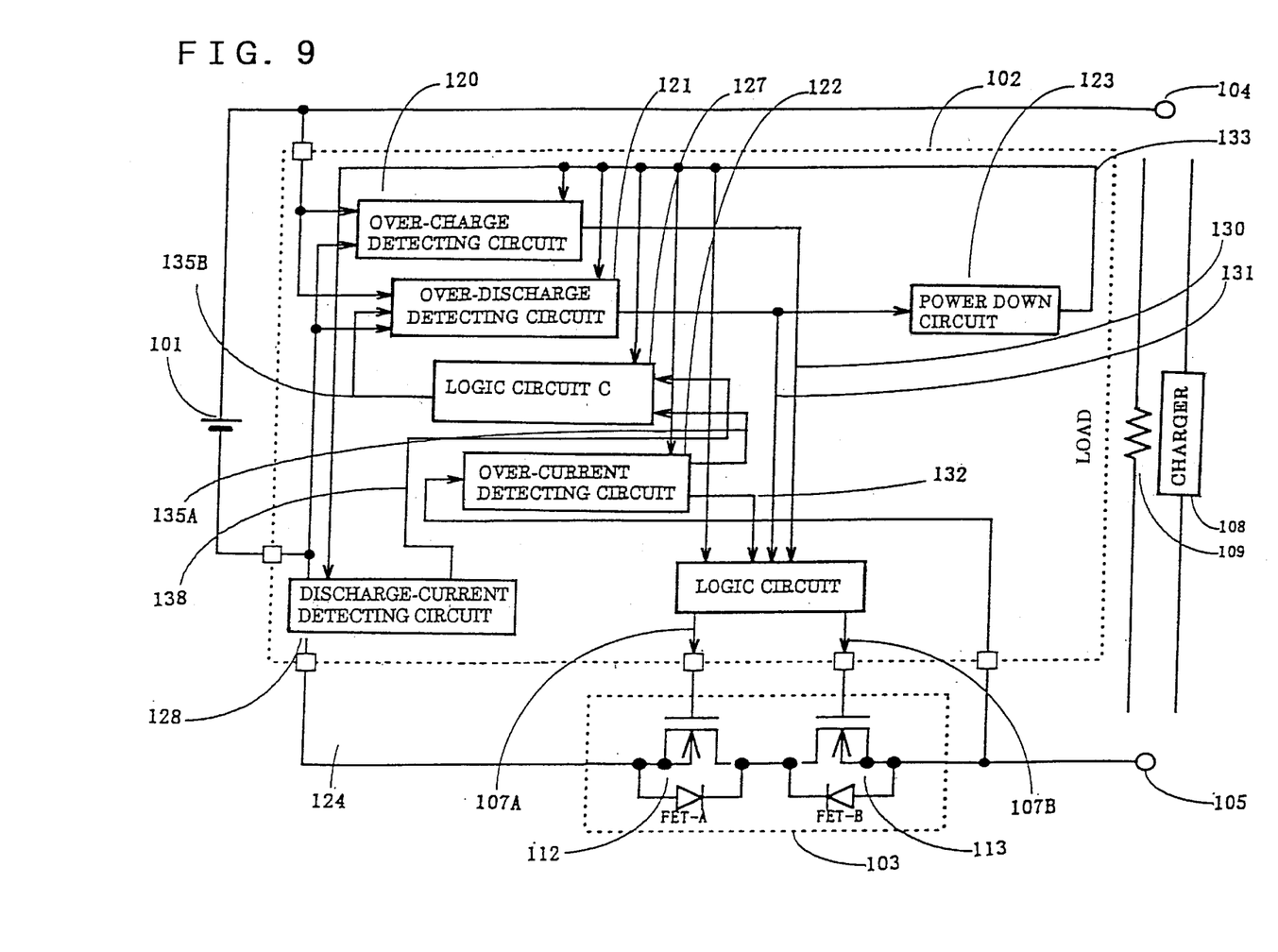
FIG. 9 is a circuit block diagram showing another embodiment of a charge and discharge control circuit and a chargeable power supply unit of the present invention.

FIG. 9 is a circuit block diagram showing another embodiment of a charge and discharge control circuit and a chargeable power supply unit of the present invention. Comparing with FIG. 1, in FIG. 9, a discharge current detecting circuit 128 is connected between a secondary cell 101 and an FET-A 112 in series. The discharge current detecting circuit outputs a discharge current stopping signal 138 at stop of discharge current. The discharge current stopping signal 138 is input to the logic circuit C 127. Other circuit operation is similar to FIG. 1.

Figure 10:
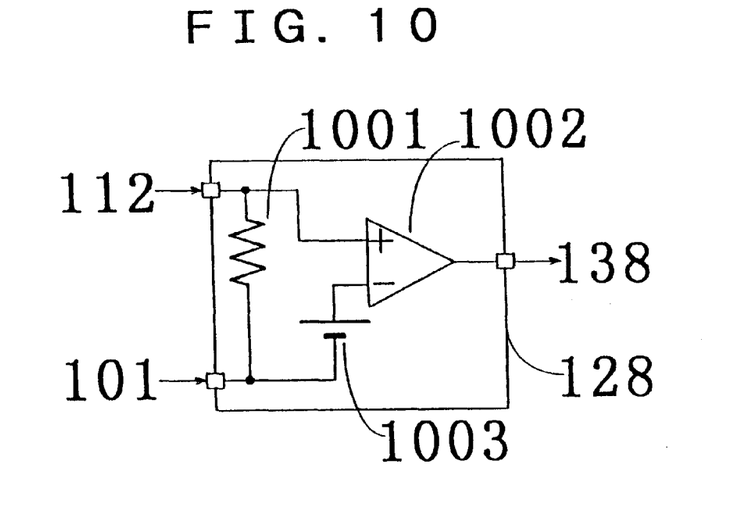
FIG. 10 is a circuit diagram showing an embodiment of a discharge current detecting circuit 128 in the charge and discharge control circuit of the present invention.

FIG. 10 is a circuit diagram showing an embodiment of a discharge current detecting circuit 128 in a charge and discharge control circuit of the present invention. In FIG. 10, the discharge current detecting circuit 128 comprises a SENS resistor circuit 1001, a detector circuit 1002, and a reference voltage circuit 1003. When the FET-A 112 stops discharge by a discharge inhibiting signal 107A so that discharge current decreases, current flowing through the SENS resistor circuit 1001 decreases so that voltage input to the detector circuit 1002 is reduced. By comparing the voltage generating by SENS resistor circuit 1001 with reference voltage circuit 1003 outputting the predetermined voltage, the discharge current detecting circuit 128 can output a discharge current stopping signal 138. When the discharge current stopping signal 138 is input, the logic circuit C 127 can cancel an over-discharge detecting inhibiting signal 135 B. Thus, the discharge current detecting circuit 128 can take a not only simple, small but various circuit construction. The logic circuit C 127 too can take a simple, small, various construction.

In the embodiment of FIG. 9, as the over-discharge detecting inhibiting signal 135 B is canceled detecting voltage reduced by stop of discharge current, stop of discharge current is monitored. Because of this, an advantage similar to the embodiment of FIG. 1 is obtained.

As above-mentioned, the charge and discharge control circuit and chargeable power supply unit of the present invention have essence of circuit construction in which over-discharge detecting is inhibited immediately after occurrence of over-current state and over-discharge detecting inhibit is canceled detecting operation stopping discharge current or phenomena occurring by the stop of discharge current, and it is not limited to any embodiments.

In the charge and discharge control circuit and the chargeable power supply unit of the present invention, when over-current state and over-discharge state occur at the same time, the above-mentioned circuit construction does not turn in power down state so as to keep surely operation of the charge and discharge control circuit. As over-discharge detecting starts again immediately after turning in over-current protection state so as to stop discharge current and voltage of the secondary cell returns, the circuit construction turns in power down state and stops operation of the charge and discharge control circuit so as to prevent useless power consumption. Because of this, it is possible to prevent useless power consumption and to extend the cell-life. Further, long delay time with margin does not need, and over-discharge detecting delay time can be determined freely without limitation of over-current detecting delay time. As a small, simple detecting circuit and logic circuit are constructed for the complex, large delay circuit, a small, low-cost charge and discharge control circuit and chargeable power supply unit can be manufactured so as to reduce cost of a cell pack and portable device using it.

The charge and discharge control circuit and chargeable power supply unit of the present invention have an advantage to control surely operation turning in power down state or operation inhibiting the power down state only by a small, simple change of circuit. Because of this, a charge and discharge control circuit without malfunction is provide. Therefore, charge and discharge control of the secondary cell is carried out correctly and the charge and discharge control circuit has an advantage extending the cycle-life of the secondary cell.

Moreover, as correct operation of the charge and discharge control circuit is guaranteed, the charge and discharge control circuit has an advantage to need the long delay time like the prior art. The charge and discharge control circuit has also an advantage to determine freely over-discharge detecting delay time without limitation of over-current detecting delay time.

The charge and discharge control circuit has an advantage to widen degrees of freedom for design of the circuit as a simple, small detecting circuit is added for the complex, large delay circuit. The present invention has an advantage to provide a small, low-cost charge and discharge control circuit and chargeable power supply unit as they are made in small circuit area. Therefore, a secondary cell pack or a portable device using it is manufactured in low cost.

What is claimed is:

1. A charge and discharge control circuit comprising: over-current detecting means for detecting an over-current state of a secondary cell; over-discharge detecting means for detecting an over-discharged state of the secondary cell; and over-discharge detection inhibiting means for sending a signal to the over-discharge detecting means when the over-current detecting means detects that the secondary cell is in an over-current state to stop the over-discharge detecting means from performing an over-discharge detecting function.

2. A charge and discharge control circuit according to claim 1; wherein the over-discharge detection inhibiting means comprises a logic circuit.

3. A charge and discharge control circuit according to claim 1; further comprising overcharge detecting means for detecting an overcharged state of the secondary cell.

4. A charge and discharge control circuit according to claim 1; further comprising at least one external connection terminal connected to the secondary cell, and a switch circuit connected to the secondary cell for selectively connecting the secondary cell to the external control terminal.

5. A charge and discharge control circuit according to claim 1; wherein the over-discharge inhibiting means includes means for sending a signal to the over-discharge detecting means to re-start the over-discharge detecting function thereof after a discharge current of the secondary cell has been stopped by opening the switch circuit in response to a detected over-current state by the overcurrent detecting means.

6. A charge and discharge control circuit according to claim 1; wherein the over-discharge detecting means and the overcurrent detecting means each comprises a voltage detector and a delay circuit.

7. A charge and discharge control circuit comprising: over-current detecting means for detecting an overcurrent state of a secondary cell; over-discharge detecting means for detecting an over-discharged state of a secondary cell; an external connection terminal for connecting the secondary cell to an external device; a switch circuit for selectively connecting and disconnecting the secondary cell and the external connection terminal; and means for temporarily stopping the over-discharge detection operation of the over-discharge detecting means upon detection of an overcurrent state of the secondary cell by the overcurrent detecting means, and for restarting the over-discharge detecting operation in response to a signal sent to the switch circuit to disconnect the secondary cell from the external connection terminal when the over-current detecting means detects an over-current state of the secondary cell.

8. A charge and discharge control circuit comprising: over-current detecting means for detecting an over-current state of a secondary cell; over-discharge detecting means for detecting an over-discharge state of a secondary cell; and means for temporarily stopping the over-discharge detection operation of the over-discharge detecting means upon detection of an overcurrent state of the secondary cell by the overcurrent detecting means, and for re-starting the over-discharge detecting operation of the over-discharge detecting means in response to a signal generated when discharge current is stopped by the over-current detecting means.

9. A charge and discharge control circuit according to claim 8; further comprising a discharge current detecting circuit connected in series to the secondary cell for generating the signal when the discharge current is stopped.

10. A charge and discharge control circuit according to claim 8; further comprising an external connection terminal for connecting the secondary cell to an external device; a switch circuit for selectively connecting the secondary cell and the external connection terminal; and a circuit connected in series with one terminal of the secondary cell for detecting a voltage between the one terminal of the secondary cell and the switch circuit and generating the signal when discharge is stopped connected in series.

11. A rechargeable power supply unit comprising:

a secondary cell;

external connection terminals connected to the secondary cell and being connectable to a load for supplying power to the load and to a charging device for charging the secondary cell;

a switch circuit connected in series between the secondary cell and at least one of the external connection terminals; and a charge/discharge control circuit connected to the secondary cell for monitoring a voltage and a current of the secondary cell and controlling the switch circuit to disconnect the secondary cell from the external connection terminals a predetermined time after the voltage of the secondary cell is detected to be one of greater than an overcharge detection voltage which indicates that the secondary cell is in an overcharged state and below an over-discharge detection voltage which indicates that the secondary cell is in an over-discharged state, and for disconnecting the secondary cell from the external terminals when the secondary cell is in an overcurrent state;

wherein the charge/discharge control circuit comprises an overcurrent detecting circuit for detecting an overcurrent state of the secondary cell and outputting an overcurrent detection signal a predetermined time thereafter, and an over-discharge detecting circuit for detecting an over-discharged state of the secondary cell and outputting an over-discharge detection signal a predetermined time thereafter, an over-discharge detection inhibiting circuit for stopping the charge/discharge control circuit from detecting an over-discharged state of the secondary cell from the time that an overcurrent state of the secondary cell is detected until the time that the switch circuit is operated to disconnect the secondary cell from the external connection terminals after detection of an overcurrent state.

* * * * *